(12) United States Patent
Jacobs

(10) Patent No.: US 7,073,835 B2
(45) Date of Patent: Jul. 11, 2006

(54) BALE WAGON HAVING A DAMPER FOR THE ROLLING RACK

(75) Inventor: Stephen W. Jacobs, Lititz, PA (US)

(73) Assignee: CNH America LLC, New Holland, PA (US)

( * ) Notice: Subject to any disclaimer, the term of this patent is extended or adjusted under 35 U.S.C. 154(b) by 46 days.

(21) Appl. No.: 10/853,626

(22) Filed: May 24, 2004

(65) Prior Publication Data

US 2005/0258662 A1 Nov. 24, 2005

(51) Int. Cl.
*B61D 45/00* (2006.01)
(52) U.S. Cl. ............................................ 296/3; 410/87
(58) Field of Classification Search ................... 296/3; 410/77, 87
See application file for complete search history.

(56) References Cited

U.S. PATENT DOCUMENTS

| 3,934,734 | A | | 1/1976 | Grey et al. | 414/789.3 |
|---|---|---|---|---|---|
| 4,227,845 | A | | 10/1980 | Colby et al. | 414/789.3 |
| 4,289,436 | A | | 9/1981 | Zipser et al. | 414/76 |
| 4,307,876 | A | | 12/1981 | Cleaves | 267/139 |
| 4,344,728 | A | | 8/1982 | Echols et al. | 414/789.3 |
| 4,372,723 | A | | 2/1983 | De Coene et al. | 414/111 |
| 4,949,852 | A | * | 8/1990 | Allen | 211/151 |
| 4,955,489 | A | * | 9/1990 | Allen | 211/151 |
| 5,549,351 | A | * | 8/1996 | Park | 296/207 |
| 5,683,215 | A | * | 11/1997 | Gaignard et al. | 411/34 |
| 5,769,593 | A | * | 6/1998 | Buffaloe | 414/537 |
| 5,938,047 | A | * | 8/1999 | Ellis et al. | 211/1.57 |
| 6,076,871 | A | | 6/2000 | Jarvis et al. | 293/123 |
| 6,079,630 | A | * | 6/2000 | Schroeder | 238/8 |
| 2002/0146311 | A1 | | 10/2002 | Millsap | 414/789.7 |

* cited by examiner

*Primary Examiner*—H Gutman
(74) *Attorney, Agent, or Firm*—Stephen A. Bucchianeri; John William Stader; Michael G. Harms

(57) ABSTRACT

An improved bale wagon having at least one bumper member to position the rolling rack at the proper distance from the end of the front load rack of the bale wagon, and to dampen the impact between the front wall of the load rack and the front end of the rolling rack of the bale wagon when the rolling rack returns to the front of the load rack after release of its spring bias.

12 Claims, 3 Drawing Sheets

BALE WAGON HAVING A DAMPER FOR THE ROLLING RACK

TECHNICAL FIELD

This invention relates generally to bale wagons, and more particularly, to an apparatus disposed between the rolling rack and the load rack of a bale wagon. The apparatus serves to precisely locate the rolling rack and to dampen the impact between the rolling rack and the load rack when they engage at the initial loading position.

BACKGROUND ART

It is accepted present day practice to form bales of crop materials, such as hay or the like, into stacks through the employment of an automatic bale wagon. One type of bale wagon which has achieved wide-spread commercial acceptance is the automatic bale wagon which employs the three table concept, as originally illustrated and described in U.S. Pat. No. 2,848,172 which issued to Gordon E. Grey. Many refinements have been made to the Grey bale wagon, such as those shown in U.S. Pat. No. 3,945,507. However, the basic concept has remained substantially the same.

This type of bale wagon includes a first table which successively receives bales from a bale loader or pick-up on the wagon frame and accumulates a predetermined number of bales, for example, two, being arranged end-to-end in a row. The Grey bale wagon also includes a second table which successively receives the accumulated predetermined number of bales from the first table and accumulates them in a plurality of rows, such as four, five or six rows, the plurality of rows commonly being known as a tier of bales. The second table then rotates the tier of bales 90 degrees about a horizontal axis and deposits the tier of bales in a vertical orientation on the third table. The third table, also known as the load bed, then successively receives the vertical tiers from the second table and accumulates a plurality of the tiers, for example seven, to form a stack. Once the stack has been accumulated on the load bed or third table, it may be unloaded by tilting the load bed to deposit the stack on the ground with the first tiers of bales which were previously accumulated on the second table now being the lowermost tiers of the stack in contact with the ground surface.

Typically the load rack has a rolling rack that is capable of moving forwardly and rearwardly along the load bed supported by a lower end moveable within a forward to rearward channel on the load bed. The rolling rack is moved rearwardly from an initial or first position at a forward location on the load bed as each tier of the stack of bales is deposited on the load bed until the stack is fully formed. This rolling rack then supports the stack of bales as the third table is tilted to deposit the bales on the ground. The rolling rack, held in place by a cable and spring drive, or the like, is then released and returned to its original or initial position near the forward end of the load rack to repeat the process with additional bales of crop.

Return of the rolling rack to the appropriate initial position adjacent the forward end of the load bed is desirable for proper load bed operation. If the load rack is initially positioned too far forward, the bales may overhang the front edge of the load bed causing difficulty in loading subsequent tiers of bales without compressing or damaging the crop. If the load rack is initially positioned too far rearward, the tiers of bales may misalign or the bales may move relative to one another as the third bed is rotated and the stack of bales is deposited on the ground. This movement may cause damage to the rolling rack due to the shifting loads exerted on the rolling rack.

To return the rolling rack to its initial position adjacent to the forward end of the load rack, the energy stored in the spring of the cable and spring drive is released, propelling the rolling rack forward until the rolling rack slams against the front wall of the channel of the load rack. This slamming contact can result in severe wear to both the rolling rack channel walls and the metal stops on the rolling rack, and can make a loud noise upon impact.

Thus, what is sought is a new apparatus that will locate the rolling rack in its desired initial position in a predetermined spaced relation to the forward end of the load rack and cushion the impact when the rolling rack is returned to its initial position.

SUMMARY OF THE INVENTION

According to the invention, an apparatus that positions the rolling rack at the appropriate point on the load rack and cushions the metal to metal impact created when the rolling rack collides with the front of the load rack is disclosed. This apparatus provides a means to adjust the precise position of the rolling rack within the channel to the desired location depending on roller clearance, crop conditions, bale size and wear of the machinery. According to the preferred method of the invention, large bumpers made of a shock absorbent material, such as rubber, are attached between the metal stops on the rolling rack and the front of the rolling rack channel at the exact location where the rolling rack collides with the front of the channel of the load rack. The bumpers may be placed on the metal stops of the rolling rack or on the inside of the channel at the front of the load rack. The bumpers are placed to absorb the energy from the collision of the rolling rack and the front of the channel on the load rack. The size of the bumper must be large enough to absorb the energy, but not so large as to interfere with the operation of the rolling rack. One or more shims may be placed between the bumper and the surface to which the bumper is attached to adjust the starting point of the rolling rack depending on roller clearance, crop conditions, bale size and machine wear.

DETAILED DESCRIPTION OF THE INVENTION

Figure 1:
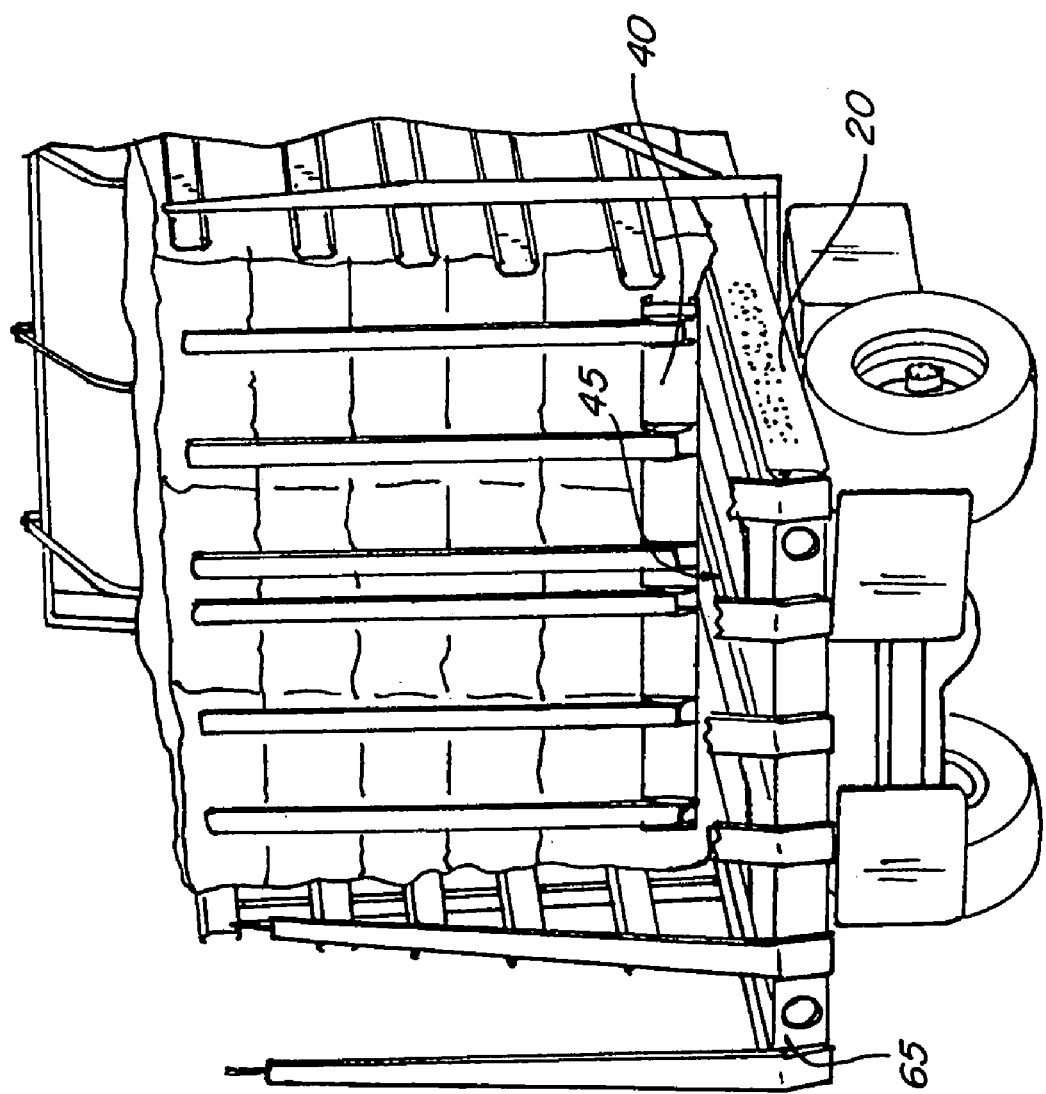
FIG. 1 is a rear perspective view of the bale wagon of the present invention with the rolling rack positioned on the load rack.

Referring now to the drawings, FIG. 1 is a rear perspective view of a bale wagon, partially loaded, with a rolling rack 40 near the rear 65 of the load rack 20, but where the bumper feature cannot be seen.

Figure 2:
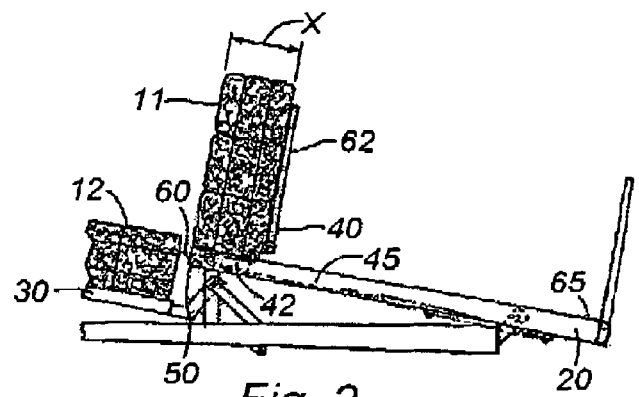
FIG. 2 is a left side view of a partially loaded load rack and rolling rack from the bale wagon of this invention.

At FIG. 2, there is a partially loaded load rack 20 wherein the second table 30 of a bale wagon is positioned to deposit a tier of bales 12 onto the third table or load rack 20. Rolling rack 40, via front portion 42, slideably engages within channel 45 of the load rack 20. For proper loading, the rolling rack 40 is at a distance X (width of a bale) from the tines 62 of the rolling rack 40. When a tier of bales 12 is deposited on the load rack 20, it pushes against tier of bales 11 and forces the rolling rack 40 to move towards the back 65 of the load rack 20. Each subsequent tier of bales (not shown) deposited on the load rack 20, causes the rolling rack 40 to move towards the back 65 of the load rack until a stack of bales is formed. After the stack is dumped, the rolling rack 40 returns to the front end 60 of load rack 20 via release of its spring bias.

Figures 3, 3A:
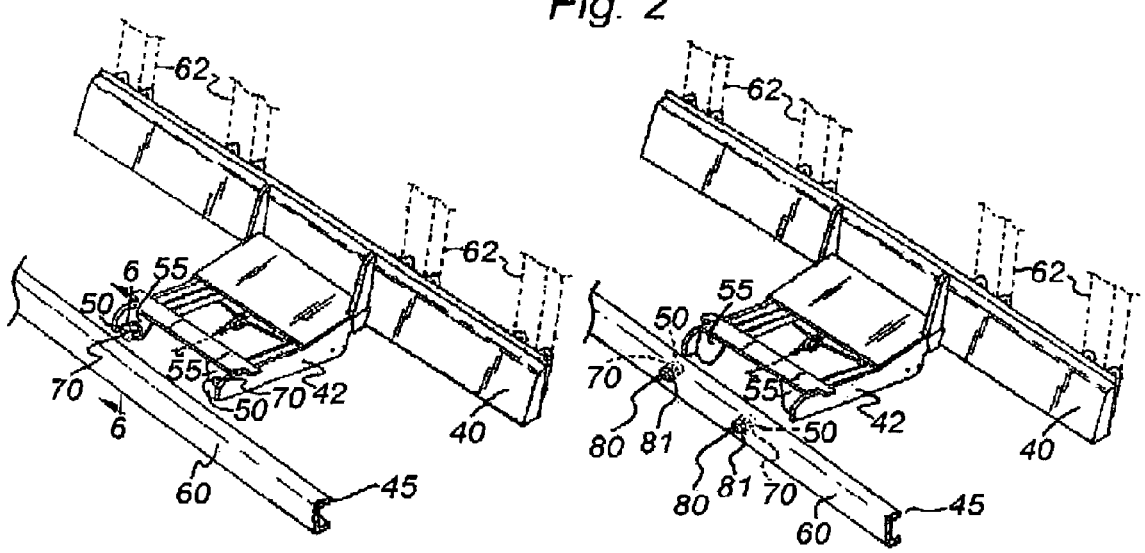
FIG. 3 is a front perspective view of the rolling rack with the cushioning bumpers of the present invention.
FIG. 3a is a front perspective view of an alternate embodiment of the rolling rack with the cushioning bumpers of the present invention shown in FIG. 3.

In FIG. 3, the rolling rack 40 extends to a front most portion 42 which slideably engages in channel 45 of load rack 20 as described above and as depicted in FIG. 2. Bumpers 50 are fixed against stops 55 at the front most portion 42 of the rolling rack 40.

Figure 4:
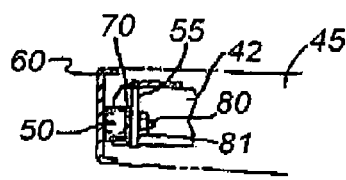
FIG. 4 is a side view of the bumper, the shim, and the front end of the rolling rack of the present invention.
Figure 4A:
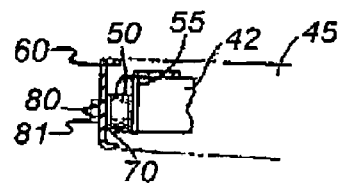
FIG. 4a is a side view of an alternate embodiment of the bumper, the shim, and the front end of the rolling rack of the present invention shown in FIG. 4.

Referring to FIG. 4, one bumper 50 affixed to stop 55 via shim 70 at front portion 42 of the rolling rack 40 collides with the front 60 of load rack 20 within channel 45. The use of a shim 70, positioned between the bumper 50 and the stop 55, effectively increases the distance from the tines 62 of the rolling rack 40 to the front 60 of the load rack 20. The use of one or more shims 70 can adjust the rolling rack 40 to the desired forward position at the front 60 of load rack 20 within the channel 45, thus facilitating more effective loading of the next tier of bales after the bumper 50 collides with the front 60 of the load rack 20.

Figure 5:
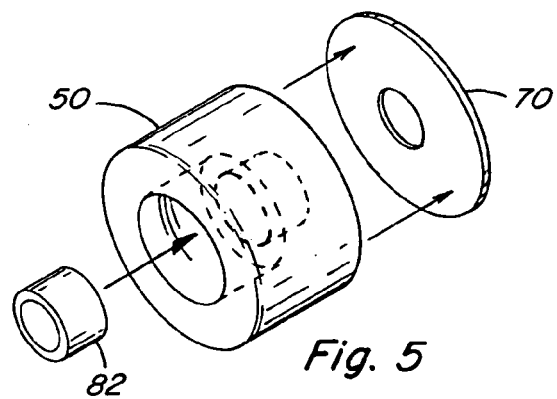
FIG. 5 is a perspective view of one embodiment of the bumper, a shim, and the metal casing of the invention.

Referring now to FIG. 5, one alternative embodiment of the bumper 50 and the shim 70 are depicted apart from one another. This embodiment can be attached to the stop 55 on the rolling rack front portion 42 of the rolling rack 40, or inside the channel 45 at the front 60 of the load rack 20 using any conventional method. When a bolt 80 is used to attach the bumper 50, as shown in FIG. 6, a sleeve 82 is provided to prevent deformation of the bumper 50 when the nut 81 is tightened onto the bolt 80.

Figure 6:
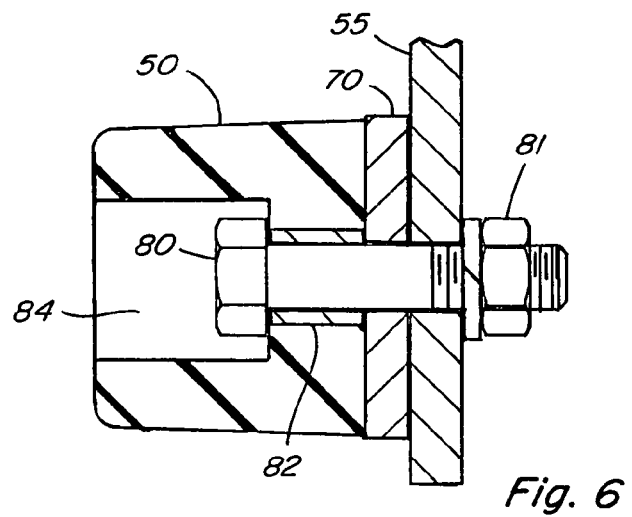
FIG. 6 is a cross-sectional view taken along line 6—6 of FIG. 3 of the embodiment of the bumper shown in FIG. 5.

Referring to FIG. 6, the alternative embodiment design of the bumper 50 and the shim 70 are attached face-to-face by the bolt 80 and the nut 81 inside a recessed opening 84, which is molded inside the bumper 50, and which opens into a hole which fittingly receives the bolt 80.

Figure 7:
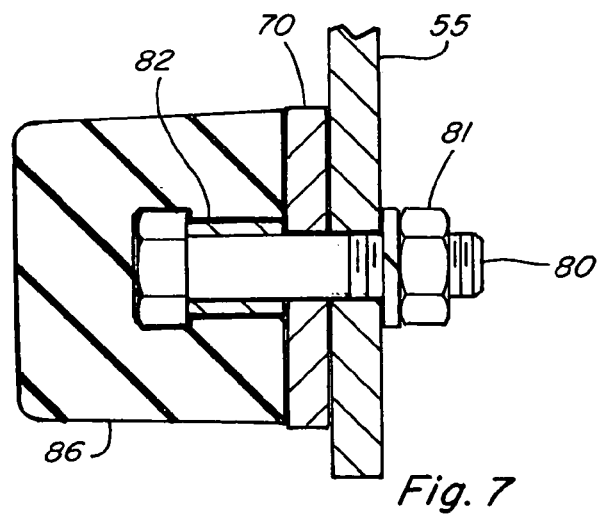
FIG. 7 is a cross-sectional view taken along line 6—6 of FIG. 3 of an alternative embodiment of the bumper design used in the invention.

Referring to FIG. 7, yet another embodiment design is bumper 86 attached face-to-face with the shim 70 by the embedded bolt 80 which can only be removed through the end of the bumper 86 which faces shim 70. As is also found in the alternative embodiment shown in FIGS. 5 and 6, a sleeve 82 is provided to prevent deformation of the bumper 50 when the nut 81 is tightened onto the bolt 80.

It is to be understood that in addition to or as an alternative to the above description, the bumper can be attached to the front wall 60 within the channel 45 of load rack 20, as opposed to being attached to the stops 55. Additionally, the bumper 50, can be attached to the load rack stop 55 or the front wall 60 within the channel 45 of the load rack 20 without a shim 70. In that situation, the size of the bumper 50 can be varied to position the rolling rack 40 in the desired position at the front 60 of the load rack 20.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. In a bale wagon, comprising:
   (a) a load rack with a channel therein, said channel having a front wall, and
   (b) a rolling rack with a front end located within said channel, the improvement comprising:
   a bumper assembly attached at said front end of the rolling rack, said bumper assembly comprising:
   a bumper member having a recessed opening therein;
   a mounting bolt passing through a portion of the bumper member for securing said bumper member to the rolling rack;
   a nut threadedly engaging said mounting bolt; and
   a sleeve situated to prevent deformation of the bumper member when the nut is threaded on the mounting bolt securing the mounting bolt and bumper member to the rolling rack;
   whereby said bumper member is in position to absorb energy upon collision with the front wall of the channel.

2. The apparatus of claim 1 further comprising at least one shim placed between each bumper member and the front end of the rolling rack at the point where the bumper member is to be attached to the rolling rack, whereby the shim allows adjustment of the position of the rolling rack.

3. The apparatus of claim 2 wherein a plurality of bumper members and shims are attached at said front end of the rolling rack.

4. The apparatus of claim 1 further comprising a second bumper member attached at said front wall of the channel, whereby said bumper members are in position to absorb energy upon collision of the front end of the rolling rack and the front wall of the channel of the load rack.

5. The apparatus of claim 4 further comprising at least one shim placed between each bumper member and the front end of the rolling rack at the point where the bumper member is to be attached to the rolling rack, whereby the shim allows adjustment of the position of the rolling rack.

6. The apparatus of claim 5 wherein a plurality of bumper members and shims are attached at said front end of the rolling rack.

7. The apparatus of claim 4 further comprising at least one shim placed between each bumper member and the front wall of the channel of the load rack at the point where the bumper member is to be attached to the load rack whereby the shim allows adjustment of the position of the rolling rack.

8. The apparatus of claim 7 wherein a plurality of bumper members and shims are attached at said front wall of the channel of the load rack.

9. The apparatus of claim 8 wherein a plurality of bumper members and shims are attached at said front end of the rolling rack.

10. In a bale wagon, comprising:
   (a) a load rack with a channel therein, said channel having a front wall, and
   (b) a rolling rack with a front end located within said channel, the improvement comprising:
   at least one bumper assembly attached at said front wall of the channel, said bumper assembly comprising;
   a bumper member having a recessed opening therein;
   a mounting bolt passing through a portion of the bumper member for securing said bumper member to the front wall of the channel;
   a nut threadedly engaging said mounting bolt; and
   a sleeve situated to prevent deformation of the bumper member when the nut is threaded on the mounting bolt securing the mounting bolt and the bumper member to the front wall of the channel;
   whereby said bumper member is in position to absorb energy upon collision with the front end of the rolling rack.

11. The apparatus of claim 10 further comprising at least one shim placed between each bumper member and the front wall of the channel of the load rack at the point where the bumper member is to be attached to the load rack whereby the shim allows adjustment of the position of the rolling rack.

12. The apparatus of claim 11 wherein a plurality of bumper members and shims are attached at said front wall of the channel of the load rack.

* * * * *